United States Patent [19]

Sheaffer et al.

[11] Patent Number: 5,024,710

[45] Date of Patent: Jun. 18, 1991

[54] PROCESS OF APPLYING A SPECULAR SURFACE FINISH TO A CARBON-CARBON SUBSTRATE

[75] Inventors: Patrick M. Sheaffer, Hawthorne; James A. Noblet, Gardena, both of Calif.

[73] Assignee: The Aerospace Corporation, El Segundo, Calif.

[21] Appl. No.: 491,413

[22] Filed: Mar. 9, 1990

[51] Int. Cl.$^5$ .................. B05D 3/02; B05D 5/06; B32B 31/12; G02B 5/08

[52] U.S. Cl. ........................ 156/89; 156/327; 156/334; 264/1.2; 264/1.9; 264/29.5; 264/29.7; 264/232; 350/641; 423/449; 427/162; 427/228; 427/279; 427/385.5; 427/407.1

[58] Field of Search ........................ 264/1.9, 29.1, 29.5, 264/29.6, 29.7, 134, 136, 137, 232, 248, 250, 257, 344, 1.2, 1.7, 129, 135; 156/155, 242, 245, 304.1, 304.6, 322, 334, 89, 327; 350/631, 641; 423/445, 447.1, 447.4, 447.7, 447.8, 448, 449; 427/162, 226, 227, 228, 249, 385.5, 407.1, 256, 279

[56] References Cited

U.S. PATENT DOCUMENTS

| | | | |
|---|---|---|---|
| 4,451,119 | 5/1984 | Meyers et al. | 350/641 X |
| 4,772,111 | 9/1988 | Shimura et al. | 350/641 |
| 4,814,232 | 3/1989 | Bluege et al. | 427/162 X |
| 4,915,494 | 4/1990 | Shipley et al. | 350/641 |

*Primary Examiner*—Leo B. Tentoni
*Attorney, Agent, or Firm*—William J. Burke

[57] ABSTRACT

A novel method is disclosed for producing specular surfaces, composed of pure carbon, on carbon-carbon composites of arbitrary weave configuration. The method utilizes a thin sheet of fine grained polycrystalline graphite as a stress-isolating interlayer between the composite substrate and the specular surface layer. The interlayer is bonded to the carbon-carbon substrate with a high char yield carbonizable adhesive. An outer layer of glassy carbon is then applied using a high char yield resin solution or (lacquer). The resulting assembly is then carbonized to convert all uncarbonized polymer to carbon. The interlayer prevents the propagation of the substrate carbon-carbon composite's crack structure to the glossy carbonized polymer surface thus formed, resulting in a high degree of specularity and zero gas permeability.

3 Claims, No Drawings

PROCESS OF APPLYING A SPECULAR SURFACE FINISH TO A CARBON-CARBON SUBSTRATE

STATEMENT OF GOVERNMENT INTEREST

The invention described herein may be manufactured and used by or for the Government of the United States for governmental purposes without the payment of royalty therefor.

BACKGROUND OF THE INVENTION

1. Field of the Invention

This invention relates to surfaces on carbon-carbon composites, and more particularly to processes for creating specular surfaces on such composites.

2. Description of the Prior Art

Smooth coatings on carbon-carbon ("CC") composites are of utility in several fields, including fluids, structures and optics. For example, smooth coatings improve fluid flow across the surfaces of CC composites. Smooth coatings also provide CC composites with oxidation protection by providing a good foundation for subsequent oxidation protection coatings. Finally, optical emittance, absorptance, and reflectance are directly related to the smoothness or specularity of the surface.

Currently, the microcrack network inherent in CC composites yields at best a diffusely reflective surface, even after polishing. Such a surface is generally unacceptable for optical mirror applications.

CC composite optical mirrors are important components of many systems, but are especially important in space systems. The availability of a method for CC mirror fabrication is of particular interest because CC composites offer distinct advantages over conventional mirror materials, such as glass or metal. CC composites possess a high degree of dimensional stability, and therefore thermal shock resistance.

Dimensional stability is important for optical mirrors in order to preserve the shape of the optical surface. CC composites are also very light weight and strong, making them attractive for space applications. The only mirror materials with similar thermal expansion characteristics to CC composites, such as silica or low expansion glasses, are very heavy.

The prior art generally consists of applying carbon-forming lacquers directly to carbonaceous substrates. These lacquers generally consist of synthetic or natural polymers which have a high char yield in inert atmosphere. The lacquer is thermally decomposed in an inert atmosphere, generally to temperatures in excess of 800° C., to yield a residual carbon coating on the substrate. During this decomposition (pyrolysis), the charing lacquer is extremely weak, allowing cracks and stresses, in the case of a CC composite substrate, to propogate through the carbon coating, as discussed above.

A variant of the above method consists of applying thermally decomposed carbon (pyrolytic carbon) to a substrate surface. This method also cannot form crack-free, specular surfaces on CC composites because of their anisotropic expansion. Localized thermal expansion anisotropies crack the pyrolytic carbon coating as the sample is cooled from the deposition temperature (>850° C.). Occasionally, it is possible to form very thick (>0.5 mm) pyrolytic carbon layers which are largely or totally crack free, but this is neither very reproducible nor are the coatings thus formed very adherent. Such coatings are generally observed to preferentially spall off the substrate during intense mechanical or thermal loading. It is therefore a primary object of the present invention to provide a method by which a smooth, specular surface can be applied to a CC composite. It is also an object of this invention to provide a surface which can withstand extremes of heat and temperature, particularly those found in space.

SUMMARY OF THE INVENTION

This invention provides a method by which a smooth, specular, crack- and void-free finish is applied to a CC composite. Briefly, the finish is composed of a polycrystalline graphite (PCG) interlayer, with a glassy carbon outer layer forming the specular finish. The outer layer is economically fabricated by the inert atmosphere pyrolysis of an applied high-char-yield organic resin lacquer, such as polyarylacetylene (PAA). The PCG interlayer is bonded to the CC composite substrate using the same lacquer as a carbon adhesive precursor. The assembly is then carbonized by suitable heat treatment. The finish thus achieved is durable and well bonded to the composite and smooth enough to be used for optical mirror (specular) surfaces. Such a laminated composite may be referred to as a Hybrid Composite, as it combines useful properties of both fiber composites and PCG's.

DETAILED DESCRIPTION OF THE PREFERRED EMBODIMENT

The primary difficulty in forming surface finishes or films on CC composites has its roots in the composite structure. There are two major causes of the void and defect structure in CC composites; one is the incomplete densification of the matrix regions, the other is the highly anisotropic nature of the carbon used in composites. Void and crack networks permeate typical composites and appear at free surfaces as surface defects. Carbon, in the form which it is used in composites, is highly anisotropic in its thermal expansion, so upon cool-down from processing temperatures, the development of a complex macro- and microcrack network is inevitable. The carbon filaments are highly anisotropic in thermal expansion and are wound together into yarns which are therefore also highly anisotropic. By various known means, these yarns are woven or braided or formed, then impregnated with resins or other organic precursor, and carbonized to form a CC composite. Upon cool down of the filaments and matrix there results a crack structure with the interfilament distance ($\approx 10$ microns) as its characteristic periodicity. The yarn bundle anisotropy results in a crack network with the yarn bundle diameter ($\approx 1-2$ millimeters) as its characteristic periodicity. Thus, a two-level material defect structure is characteristic of CC composites: macro-level (1-2 mm) from the yarn periodicity and microlevel ($\approx 10$ $\mu$m) from the filament periodicity. The matrix carbon, if it is graphitic (i.e., crystalline), can also contain cracks as close as 1 $\mu$m apart.

However, the defect structure of glassy (i.e., amorphous) carbon ("GC") is on the submicroscopic-level, being less than 0.02 $\mu$m between pores on average, with pore diameters in the range of tens of angstroms, similar to an ordinary inorganic glass. Glassy carbon therefore provide a highly suitable surface for very smooth or optically reflective carbon surfaces. The problem then becomes one of providing a suitable interlayer between the glassy carbon finish layer and the CC composite substrate, in order to prevent the propagation of the composite's crack structure into this finish. Such an interlayer should: (1) bond tightly to both the glassy carbon surface and the composite substrate; (2) prevent the propagation of the crack structure of the CC composite into the glassy carbon finish during the cooldown from carbonization temperatures; and (3) not react detrimentally with either the finish or the substrate.

It has been found that pyrolytic graphite can be bonded to CC composites using PAA lacquer-applied carbon as a bonding agent. The bond thus established, however, is relatively weak. While it can withstand repeated heatings to above 1200° C., it can be easily fractured by hand, the estimated bond strength being on the order of 10 psi. Much higher bond strengths have been observed between polycrystalline graphite and CC substrates. This is due to the pore structure of PCG (and CC composites) which allow mechanical interlocking of the bond line and adherent. The bonding agent is therefore required to possess an adequate char yield. If the char yield of the bonding carbon is insufficient, the precursor shrinks away from the walls of the pore network during pyrolysis, and a tight mechanical bond is not established.

Fine-grained polycrystalline graphite (PCG) has been found to be a preferred interlayer material because: (1) it is porous enough to allow tight mechanical bonding between the composite substrate and the PCG interlayer; (2) PCG can be made which has a very fine grain structure (less than 5 $\mu$m), which aids in the formation of a smooth surface; and (3) fine grained PCG is very tough and prevents the propagation of the macro-level defects in the CC substrate into the final (specular) layer and is plastic enough not to fail under the stresses induced by thermal expansion mismatch between the PCG and CC substrate. The lack of a suitable interlayer having good toughness, strength and adhesive properties is a major shortcoming with glassy carbon or pyrolytic carbon coatings applied directly to CC substrates.

An alternative approach to forming the finish claimed here would be to allow the bond-forming carbon precursor to flow through the porous PCG and fill its voids. Pyrolysis and carbonization would then yield a filled PCG which could then be polished to moderate specularity. This process, although not as effective as a glassy carbon layer over the PCG, does lend itself to rapid and easy fabrication by allowing a hybrid composite to be made with PCG face sheets which are co-cured with the composite.

A third method uses a PCG face sheet (interlayer) but would have an outerlayer of pyrolytic or vapor deposited carbon in place of the GC layer.

EXAMPLE

Described below is a brief description of the preferred method, utilizing PAA as both the bonding carbon precursor for the PCG face interlayer and the glassy-carbon outer layer precursor.

Following its fabrication, the CC composite to be coated is first carbonized resulting in the crack network in the composite. The temperatures used should be in excess of 1000° C. so that the matrix is entirely converted to carbon and no pyrolysis shrinkage will occur in subsequent heat treatments.

The surface of the composite to be finished is then sanded in order to allow access of the bonding precursor to the pore structure of the composite. The mating surface of the PCG should also be smooth so that it makes good contact with the composite; a thin bond line is preferred.

Both the composite and the PCG are then coated with PAA lacquer (solution). Either surface can be solely coated but this is not as preferable as coating both adherants since the low viscosity of the bonding lacquer allows the precursor to enter the pore structures of the carbon adherents more readily than it would flow during the melt phase of the lamination/cure cycle when the viscosity of the molten resin becomes substantially higher than that of the lacquer. Since the char yield of the PAA is high, pyrolysis shrinkage is low and a tight mechanical bond is established upon carbonization.

If the processing constraints of a given application allow only one adherent to be coated with the bonding lacquer, warm or hot pressing techniques, i.e., the preheating of the lamination mold at or near the melt temperature of the bonding carbon precursor lacquer before inserting the adherents, are recommended to allow maximum flow of the precursor during the melt/flow phase of the process.

The adherents are to be bonded then placed in contact with a press or autoclave or the like in order to apply pressure during the cure of the precursor such that a thin, uniform bond is established. The heating schedule is such as to be suitable for the precursor used. For PAA, fairly rapid heating to the cure temperature ($\approx$2° C./min.) is adequate.

A slow rate of heating to carbonization ($\approx$20° C./hour) of the bonded hybrid composite is recommended since the PAA-filled PCG limits the escape paths for pyrolysis gases from the bond line. Rapid pyrolysis can result in blisters in a thin PCG layer.

After carbonization, the laminated hybrid composite is ready for the application of the GC layer. For optimum results, the outer (finish) surface of the PCG should be polished with 3 micron grade sandpaper, such as 3-M brand lapping sheets, before the PAA lacquer is applied. The surface of the smooth PCG layer is then coated with the precursor lacquer and dried. The method for making a PAA precursor lacquer will be described.

The optimum solids content for the lacquer can be empirically established; more solids result in fewer required coats to form a given specularity, but too thick a coat can crack during carbonization. It has been found that between one to ten percent solids content is suitable.

The lacquer may be applied by dipping, in which case the lacquer vehicle should be a rapidly evaporating solvent, such as MEK, in order to minimize dust pickup and meniscus formation during the drying time. If the lacquer is applied by brushing or spraying, the speed of drying should be adjusted by addition of slower drying solvents, such as toluene, to allow uniform wet coats to be applied.

The lacquer can be applied by vacuum evaporation to the PCG interlayer, thus preserving the smoothness of the PCG. This is particularly important for the formation of optical surfaces as in the case of optical mirrors.

The lacquer can be dried over night in a low humidity (less than 60% RH) environment at room temperature. Due to the thinness of most lacquer coatings, a fairly rapid carbonization is possible. Coatings have been heated to 1100° C. in 3 to 4 hours with excellent results.

By the use of an appropriate glassy carbon precursor material, a suitable bond can be established between a carefully selected polycrystalline graphite and a CC composite, the bond being able to withstand repeated rapid heatings greater than 500° C. per second to temperatures of 2000° C. without failure of the bond or the PCG or the composite substrate. This is highly unexpected behavior because the thermal expansion of PCG is about 7 to 9 microstrain per degree C. whereas that of CC composites is about −1 to 2 microstrain per degree C. Materials with such mismatched thermal expansions are generally not amenable to bonding, particularly with brittle materials such as carbon.

Mechanical loads as can result in failure of the bond between the PCG and CC are usually sufficient to result in the delamination failure of 2-dimensional composite substrates, especially if the loads are in flexure with respect to the composite plies. It is generally observed that with these hybrid specimens, the failure of the laminate occurs in the CC composite itself just below the surface of the composite substrate; this indicating that the PCG/substrate bond is at least as strong as the composite (substrate) interply bond. Indeed, bonds of this type have been made between two PCG substrates with interply tensile strengths in excess of 1000 psi; this is well above the intrinsic interply strengths of 2 D CC composites.

A suitable carbon-forming material to be used to form the bond described above is any of the isomers of polyarylacetylene (PAA), although other carbon-forming precursors can be used, provided they have adequate char yields and can be pyrolyzed and carbonized such they do not foam or crack or otherwise destroy the bond line established by the precursor.

PAA has an adequate char yield to perform as the bonding agent. Most other glassy carbon-forming materials which polymerize readily (such as epoxies) possess inadequate mass or volumetric char yields for this purpose. The mass char yield necessary for a strong mechanical bond to form is about 65% or greater.

In summary, a suitably fine grained PCG, unbonded or bonded to a CC composite can be polished or sanded smooth so that a layer of PAA or other similar glassy carbon forming polymer can be dissolved in a suitable solvent (as a lacquer) and applied to the smoothed surface of the PCG by painting, dipping, spraying, or similar method, dried to remove the solvent, and carbonized in an oven under inert (non-oxidizing) atmosphere such as nitrogen, argon, helium or the like. The carbonized polymer lacquer retains its glossy surface during the transformation to carbon, thus having an extremely smooth, crack free, specular carbon surface.

The crack network typical of a CC composite is mechanically isolated from the specular surface formed by the PCG when said PCG is bonded to such a CC composite, and that the resulting smoothly finished hybrid composite is stable to temperatures in excess of 2000 degrees centigrade.

It is evident from basic considerations that other forms of carbon can also be used to form a final smooth carbon surface on the hybrid composite. Many coating types which are compatible with PCG's, such as pyrolytic carbons, are suitable. Those mentioned, however, may not yield highly specular surfaces due to their larger scale defect structures than that of glassy carbon. They may, nonetheless, yield suitable surfaces for certain applications.

A suitable PCG for this process is POCO grade AXF-5Q. The grain size is on the order to 10 microns. Other grades of PCG with similar properties and grain sizes less than about 100 microns are also suitable.

The PAA or pyrolytic carbon final layer can be applied to the polished PCG interlayer in such a fashion that an optical surface can be preserved through the carbonization process, allowing the resulting surface to be used as an optical mirror surface.

We claim:

1. The process of applying a specular surface to a carbon-carbon (CC) composite substrate having an inherent microcrack network, said process including:
   a. coating the CC composite substrate with a high char yield organic polymer resin lacquer and allowing the lacquer vehicle to evaporate;
   b. providing a conforming interlayer for the coated CC substrate, said interlayer being composed of a polycrystalline graphite (PCG) having a tough, fine-grain structure;
   c. coating the interlayer with a high char yield organic polymer resin lacquer and allowing the lacquer vehicle to evaporate;
   d. abutting the coated surfaces of the CC composite substrate and the interlayer under pressure and curing the polymer coatings, followed by pyrolysis to provide a carbonaceous mechanical bond between the CC composite substrate and the interlayer;
   e. applying a high char yield organic resin lacquer coating to an exposed surface of the interlayer, drying the coating and pyrolyzing the residual organic resin to form a glassy carbon specular surface on the interlayer.

2. The process of claim 1 in which the organic resin in the lacquer that is applied as a bond between the CC composite substrate and the interlayer and that is used to form the specular surface is polyarylacetylene.

3. The process of claim 1 in which the high char yield resin forming a bond between the CC composite substrate and the interlayer is heated at a slow rate of about 20° C. per hour to prevent blistering of the bond by trapped gases of pyrolysis.

* * * * *